(12) United States Patent
Goodwin et al.

(10) Patent No.: US 12,076,751 B2
(45) Date of Patent: Sep. 3, 2024

(54) PNEUMATIC CONVEYING SYSTEM FOR SEPARATING BULK PRODUCT

(71) Applicant: SCHENCK PROCESS EUROPE GMBH, Darmstadt (DE)

(72) Inventors: Anthony Goodwin, Cheshire (GB); Matheus Johannes Lucas, 's-Hertogenbosch (NL)

(73) Assignee: Schenck Process LLC, Kansas City, MO (US)

( * ) Notice: Subject to any disclaimer, the term of this patent is extended or adjusted under 35 U.S.C. 154(b) by 47 days.

(21) Appl. No.: 17/635,064

(22) PCT Filed: Aug. 14, 2020

(86) PCT No.: PCT/EP2020/072882
§ 371 (c)(1),
(2) Date: Feb. 14, 2022

(87) PCT Pub. No.: WO2021/028575
PCT Pub. Date: Feb. 18, 2021

(65) Prior Publication Data
US 2022/0288641 A1   Sep. 15, 2022

(30) Foreign Application Priority Data

Aug. 14, 2019 (GB) .................................. 1911632
Oct. 1, 2019 (GB) .................................. 1914172

(51) Int. Cl.
*B07B 9/02* (2006.01)
*B04B 5/10* (2006.01)
(Continued)

(52) U.S. Cl.
CPC .................. *B07B 9/02* (2013.01); *B04C 9/00* (2013.01); *B07B 1/20* (2013.01); *B07B 1/24* (2013.01); *B07B 4/08* (2013.01)

(58) Field of Classification Search
CPC .... B07B 9/02; B07B 1/20; B07B 1/24; B04C 9/00
(Continued)

(56) References Cited

U.S. PATENT DOCUMENTS 2,280,903 A * 4/1942 Ellison ...................... B07B 7/04
241/4
2,795,463 A * 3/1953 Weller ................... B65G 53/06
406/67
(Continued)

FOREIGN PATENT DOCUMENTS

CH         556196 A      11/1974
CN      102000667 A *    4/2011 ............. B07B 11/06
(Continued)

OTHER PUBLICATIONS

Ju; Jun, "Centrifugal Separation" (English Translation), Apr. 6, 2011, worldwide.espacenet.com (Year: 2011).*
(Continued)

*Primary Examiner* — Michael Mccullough
*Assistant Examiner* — Molly K Devine
(74) *Attorney, Agent, or Firm* — Hovey Williams LLP; Paul J. Walker

(57) ABSTRACT

There as herein defined a pneumatic conveying system comprising a cyclonic feed apparatus. In particular, there is described a pneumatic conveying system comprising a vessel (e.g. a cyclonic separator) in combination with a sifting device (e.g. a centrifugal device) which is capable of separating pneumatically conveyed material into oversize powder discharge (e.g. waste material) and fine powder discharge (e.g. valuable product material).

21 Claims, 9 Drawing Sheets

(51) Int. Cl.
  *B04C 9/00* (2006.01)
  *B07B 1/20* (2006.01)
  *B07B 1/24* (2006.01)
  *B07B 1/28* (2006.01)
  *B07B 4/08* (2006.01)
  *B65G 53/16* (2006.01)
  *B65G 53/34* (2006.01)
  *B65G 53/36* (2006.01)
  *B65G 53/48* (2006.01)
  *B65G 53/52* (2006.01)
  *B65G 53/60* (2006.01)

(58) Field of Classification Search
  USPC .......................................................... 209/234
  See application file for complete search history.

(56) References Cited

U.S. PATENT DOCUMENTS

| | | |
|---|---|---|
| 3,077,365 A | 2/1963 | Chester |
| 4,202,759 A | 5/1980 | Krolopp |
| 4,580,928 A | 4/1986 | Van Abbema |

FOREIGN PATENT DOCUMENTS

| | | |
|---|---|---|
| CN | 202823845 U | 3/2013 |
| DE | 4236165 A1 | 4/1994 |
| DE | 202012010414 U1 | 1/2013 |
| GB | 963111 A | 7/1964 |
| GB | 2116064 A1 | 9/1983 |
| JP | 2002066459 A | 3/2002 |
| JP | 2003088775 A | 3/2003 |
| JP | 2013193011 A | 9/2013 |
| WO | 2005123262 A1 | 12/2005 |

OTHER PUBLICATIONS

International search report for PCT/EP2020/072882, dated Dec. 23, 2020.

* cited by examiner

PNEUMATIC CONVEYING SYSTEM FOR SEPARATING BULK PRODUCT

CROSS REFERENCE TO RELATED APPLICATIONS

This application is a National Stage application of International Application No. PCT/EP2020/072882, filed Aug. 14, 2020. This application also claims priority under 35 U.S.C. § 119 to GB Patent Application No. 1911632.6, filed Aug. 14, 2019 and GB Patent Application No. 1914172.0, filed Oct. 1, 2019, the contents of which are hereby incorporated by reference.

FIELD OF THE INVENTION

The present invention relates to a pneumatic conveying system comprising a cyclonic feed apparatus. In particular, the present invention therefore relates to a pneumatic conveying system comprising a vessel (e.g. a cyclonic separator) in combination with a sifting device (e.g. a centrifugal device) which is capable of separating pneumatically conveyed material into oversize powder discharge (e.g. waste material) and fine powder discharge (e.g. valuable product material).

BACKGROUND OF THE INVENTION

Pneumatic conveying systems are used to transfer materials such as particulates, or powders etc. through enclosed pipelines. Air is used as the conveying mechanism, carrying the materials from an inlet to an outlet of the system by transmitting a propulsive force (i.e. a positive pressure) to the material. To function correctly, the pneumatic conveying apparatus requires a pressure differential between the inlet and outlet of the system. The pressure difference is usually provided by a pump on the inlet side of the system.

In an example prior art application, materials are transferred from trucks into storage silos, via a sifter or sieve apparatus. The material is pumped via conveying air from the truck to the silo, via the sifter. However, such systems have a number of significant disadvantages. These disadvantages are addressed in the present invention.

A centrifugal sifter is a type of sifter, which is used to screen, separate, and remove material of different sizes at high rates of efficiency. The sifter contains a drum which is orientated substantially horizontally and comprises a shaft optionally with paddles attached to it, which rotates at high velocity. The material is fed into the drum from an inlet end, usually by a screw shaft. Whilst the material is inside the drum, it is forced to the interior walls of the drum by centrifugal force due to the rotation of the paddles attached to the shaft. The walls of the drum are lined with screens which are perforated with holes. The diameter of the holes determines the size of the material particulates which can pass through the sifter. The material travels along the drum, pushed along by the paddle assembly, until it has either been small enough to pass through the screens, or until it is passed along to the end of the drum to an outlet for oversized material. After the material has passed through the screens, it is gravity fed down a chute where it is reintroduced to the conveying pipeline which terminates inside the silo.

An issue which can arise in the example prior art system described above is that the perforated screens can easily become clogged up due to influxes of material entering the sifting drum. These influxes are caused by the irregular feeding of material from the truck. The truck has little control over the mass flow rate of the material being introduced into the system, due to the nature of the feed-in process. The shape of the truck hopper is mainly dictated by the dimensions of the vehicle, and is not designed for ideal material flow conditions. Large lumps and clumps of material from the truck can block the perforations of the screens, which reduces the efficiency of the sifting drum. The screens may become blocked to the extent that material cannot pass through, resulting in valuable material being fed into the 'oversized material' outlet of the sifter and therefore wasted. The drum may also overfill, resulting in a lower sifting efficiency. Blocked perforations in the sifter may also cause blockages in the conveying system upstream.

It is an object of at least one aspect of the present invention to obviate or at least mitigate one or more of the aforementioned problems.

It is a further object of at least one aspect of the present invention to provide an improved pneumatic conveying apparatus for separating a range of materials such as particulates and/or powders which are pneumatically conveyed through pipelines.

It is a yet further object of at least one aspect of the present invention to provide an improved pneumatic conveying apparatus which maintains the efficiency of the sifting in a pneumatic conveying system, and which reduces the risk of the sifting becoming blocked due to material mass flow rate fluctuations.

SUMMARY OF THE INVENTION

According to a first aspect of the present invention there is provided an apparatus for pneumatically conveying and separating bulk material comprising:
  a vessel for receiving and separating gas (e.g. air) and bulk material,
  at least one material inlet located on the vessel for inputting gas (e.g. air) and bulk material into the vessel and forming a cyclone which separates the gas (e.g. air) and bulk material within the vessel; and
  a sifting device for receiving the bulk material from the vessel wherein the bulk material is separated via centrifugal forces into at least two or more different powder discharges.

Generally speaking, the present invention therefore relates to a pneumatic conveying system comprising a vessel functioning as a cyclonic separator in combination with a sifting device functioning as a cyclonic sifting apparatus which is capable of separating pneumatically conveyed material into oversize powder discharge (e.g. waste material) and fine powder discharge (e.g. valuable product material).

The gas used may be air. Therefore, the gas used in the invention may be pressurised air (e.g. positive pressure air) above atmospheric pressure or any other type of pressurised gas above atmospheric pressure. The pressurised air and/or pressurised gas may be used to pneumatically convey the bulk material.

Typically, the vessel for receiving and separating air and bulk material may therefore be described as a cyclonic feed apparatus. The vessel is therefore capable of separating the inputted gas (e.g. air) and bulk material using a cyclone of spinning air and material.

The vessel may be substantially cylindrical in shape. The vessel may also be substantially conical in shape.

The vessel may also comprise a substantially conically shaped lower section which may be used to funnel air and/or material into the sifting device.

The vessel may also be located substantially vertically during use. The vessel may therefore have a substantially longitudinal axis extending vertically through the vessel. This allows the separated bulk material to be gravity fed to the sifting device.

The vessel may also comprise at least one, two or a plurality of material vessel inlets for inputting air and bulk material.

In preferred embodiments, the at least one, two or plurality of material vessel inlets may be substantially tangential to the longitudinal axis of the vessel. Such an arrangement facilitates the formation of a cyclone of air and bulk material (i.e. a vortex) within the vessel.

The at least one, two or plurality of material vessel inlets may be connected to a means to convey the material via a conveying gas through the apparatus.

The vessel may also comprise at least one or more air and material outlets. The at least one or more air and material outlets may feed separated air and material to the sifting device.

In use, a positive pressure gradient (i.e. above atmospheric pressure) may typically be maintained from the at least one vessel inlet to the pneumatic conveying outlet.

In use, the material may be fed into the at least one or more vessel inlets at a speed such that the material within the vessel adopts a cyclonic tubular configuration. It is preferred that the material passes from the at least one or more vessel material outlets whilst maintaining its cyclonic tubular configuration. This facilitates the separation of the air and bulk material.

The at least one more gas and/or material outlets may be substantially aligned with the longitudinal axis of the vessel.

The sifting device may comprise at least one or a plurality of material inlets for receiving air and/or material from the vessel via, for example, a material outlet from the vessel.

The sifting device may comprise a screw conveyor to transport the material from at least one vessel material outlet to at least one sifting device material inlet.

The sifting device may comprise a first material outlet and a second material outlet.

The sifting device may be in the form of a cylindrical chamber which may be positioned longitudinally. The sifting device may be lined with a series of perforations such as in the form of a perforated sheet. The sifting device may be a perforated drum.

The sifting device may therefore comprise a substantially horizontally mounted substantially cylindrical sieve (e.g. a drum) within which the feed material may be rotated and circulated at a speed of: about 100-1,000 rpm; about 200-750 rpm or about 500 rpm. The speed varies for different sizes of machines and the diameters of rotation involved.

The sifting device may rotate itself or more preferably the sifting device may comprise a form of stirrer (e.g. a shaft with a series of external protrusions such as paddles) which may be used to rotate the bulk material.

The cylindrical sieve may comprise a mesh-like structure with a series of small apertures. The apertures in the mesh-like structure may have a cross-sectional diameter of any of the following: about 50 mm; about 100 mm; about 200 mm; about 300 mm; about 380 mm; about 400 mm; about 500 mm; about 600 mm; about 700 mm; about 800 mm; about 900 mm; about 1,000 mm; or about 2,000 mm. Alternatively, the apertures may have a cross-sectional diameter of any of the following: about 100-1,000 mm; about 200-750 mm; about 300-500 mm; or about 300-400 mm.

The mesh-like structure and/or apertures in the cylindrical sieve of the sifting device may allow fine particulate material to pass through the cylindrical sieve and exit as a fine powder discharge through an outlet located below the sifting device. The cross-sectional size of the fine powder discharge particles may range from any of the following: about 50 microns to about 50 mm; about 100 microns to 10 mm; or about 200 microns to 10 mm.

The sifting device in the form of a cylindrical chamber may have a cross-sectional diameter of any of the following: about 500 mm; about 1,000 mm; about 2000 mm; or about 5000 mm.

Larger particulate material (e.g. waste material) may be retained within the cylindrical sieve and exit through an outlet as an oversize powder discharge. The size of the oversize powder discharge particles we will be larger than the cross-sectional diameter of the apertures or perforated holes in the sifting device such as the cylindrical sieve. The rate of flow of the oversize powder discharge particles may be set to achieve a waste of less than about 1% or about 0.5% of the weight of material conveyed.

The sifting device may also comprise a shaft (e.g. a cylindrical shaft) comprising outlying and/or protruding members such as paddles. The shaft may extend longitudinally and substantially horizontally through the sifting device. The outlying and/or protruding members such as paddles may stir and/or rotate the material within the sifting device. Under centrifugal forces, the stirred and/or rotated material may be forced against the sifting device such as the substantially horizontally mounted substantially cylindrical sieve (e.g. a perforated drum or mesh-like structure). This may allow separation of the bulk material to occur into larger and smaller particulate material.

During use, the sifting device may also be rotated to assist with the rotation. However, typically the material may be rotated solely using the shaft which may comprise outlying and/or protruding members such as paddles may assist the rotation of the material. The shaft may therefore be rotated along an axis of the sifting device and using the outlying and/or protruding members such as paddles the material may be rotated and/or stirred. The material may be forced via centrifugal forces to the outside surfaces of the sifting device.

By rotating the material in the sifting device causes at least part of the bulk material to pass through the perforations/or apertures in the sifting device. The material which passes through the perforations and/or apertures of the sifting device may exit the sifting device via a first material outlet. This material may be defined as fine powder discharge and is valuable product material which is required to be separated from the bulk material. Larger sized particulate material which is unable to pass through the perforations and/or apertures in the sifting device may exit the sifting device via a second material outlet. This larger sized particulate material may be defined as oversize powder discharge and is usually waste material.

The vessel and sifting device may therefore be operatively connected to allow separated air and/or bulk material to flow from the vessel to the sifting device. Any suitable type of connections may be used such as a series of pipes and/or passageways.

In particular embodiments, a pneumatic conveying outlet located on the sifting device may be connected to the vessel thereby allowing the reuse and/or recirculation of pneumatically conveyed air and/or material. The connection may be using any suitable type of pipes and/or passageways which allows air and/or material to be pneumatically conveyed. This has been found to provide the technical advantage of removing any need for additional energy sources within the apparatus to convey the air, thereby making the process more energy efficient and less complex.

In use, material may therefore be conveyed from the at least one or plurality vessel inlets, to the vessel, through a vessel material outlet, into the sifting device; and after the material is sifted in the sifting device then through a material outlet, where the material continues into the pneumatic conveying outlet.

The apparatus may also comprise a hopper to feed bulk material from a transport silo or any other storage system into the apparatus to be separated. The bulk material may be gravity fed from the hopper into the device.

The vessel for receiving and separating air and bulk material may be defined as a cyclone separator. The vessel may comprise an upper section into which the at least one material inlet inputs air and bulk material. The vessel may also comprise a lower section which may be conically shaped to funnel material into the sifting device.

The sifting device may comprise an outer casing which may contain an opening in the form of a door which may allow inspection and maintenance of the sifting device.

The apparatus may also comprise a drive assembly such as a motor which may be used to rotate the sifting device to thereby rotate the cylindrical sieve located in the sifting device.

The material may be fed at a velocity 'V' into the vessel (e.g. cyclone separator) at a range of about 8 m/s to 50 m/s.

The bulk material may therefore be caused to rotate in a cyclonic vortex due to the rotation of air within the vessel (e.g. cyclonic separator). The pneumatically conveyed air and particulate material fed into the inlet may therefore cause the cyclonic vortex rotation of the air and particulate material within the vessel (e.g. cyclone separator). During the cyclonic motion of the particulate material the particulate material may be forced to the outer surfaces of the vessel (e.g. cyclone separator) in a vortex-like manner.

During use, in the vessel particulate material may be thrown against the sidewalls of an upper section of the vessel and then funneled down along into a lower section of the vessel. The cyclone (i.e. vortex) of air may therefore build a rotating mass of material against the sidewalls of the vessel. The material being formed against the sidewalls of the vessel may therefore form, for example, a tubular shape.

A specific advantage of the rotating mass of material in the device (e.g. cyclone separator) is that the rotating mass of particulate material has the ability to absorb sudden increases and/or decreases in material feed by adjusting the thickness dimension 'T' and density of the particulate material being forced against the inner surfaces of the device (e.g. cyclone separator).

The velocity 'V' of the air and particulate material being fed into the vessel may preferably be sufficiently high to cause the particulate material to spin and form, for example, a substantially tubular shape. The required velocity 'V' of the air and particulate material being fed into the vessel may change with different materials but is typically in the range of 8 m/s to 50 m/s.

According to a second aspect of the present invention there is provided an apparatus for pneumatically conveying and separating bulk material comprising:
a vessel for receiving and separating air and bulk material,
at least one material inlet located on the vessel for inputting air and bulk material into the vessel and forming a cyclone which separates the air and bulk material within the vessel; and
a sifting device for receiving the bulk material from the vessel wherein the sifting device separates the bulk material via centrifugal forces into at least two or more different powder discharges.

According to a third aspect of the present invention there is provided an apparatus for pneumatically conveying and separating bulk material comprising:
a vessel for receiving and separating bulk material,
at least one material inlet located on the vessel for inputting bulk material into the vessel which separates the bulk material within the vessel; and
a sifting device for receiving the bulk material from the vessel wherein the sifting device separates the bulk material via centrifugal forces into at least two or more different powder discharges.

According to a fifth aspect of the present invention there is provided an apparatus for pneumatically conveying and separating bulk material comprising:
a vessel for receiving bulk material,
at least one material inlet for inputting bulk material into the vessel; and
a sifting device for receiving the bulk material from the vessel wherein the sifting device separates the bulk material into at least two or more different discharges.

According to a sixth aspect of the present invention there is provided an apparatus for pneumatically conveying and separating bulk material comprising:
a vessel;
at least one material inlet located on the vessel; and
a sifting device wherein the sifting device separates the bulk material via centrifugal forces into at least two or more different powder discharges.

According to a fifth aspect of the present invention there is provided a method of conveying and separating bulk material comprising:
providing a vessel for receiving and separating gas (e.g. air) and bulk material,
providing at least one material inlet located on the vessel for inputting gas (e.g. air) and bulk material into the vessel and forming a cyclone which separates the gas (e.g. air) and bulk material within the vessel; and
providing a sifting device for receiving the separated gas (e.g. air) and bulk material from the vessel wherein the sifting device separates the bulk material via centrifugal forces into at least two or more different powder discharges.

The apparatus for conveying and separating the bulk material may be as defined in any of the previous aspects or in combination with each other.

The method for pneumatically conveying and separating bulk material maybe as defined in any of the previous aspects or in combination with each other.

BRIEF DESCRIPTION OF THE DRAWINGS

Embodiments of the present invention will now be described, by way of example only, with reference to the following Figures.

DETAILED DESCRIPTION

Generally speaking, the present invention therefore relates to a pneumatic conveying system comprising a cyclonic separator in combination with a cyclonic sifting apparatus which is capable of separating pneumatically conveyed material into oversize powder discharge (e.g. waste material) and fine powder discharge (e.g. valuable product material). This is discussed below in detail.

Figure 1:
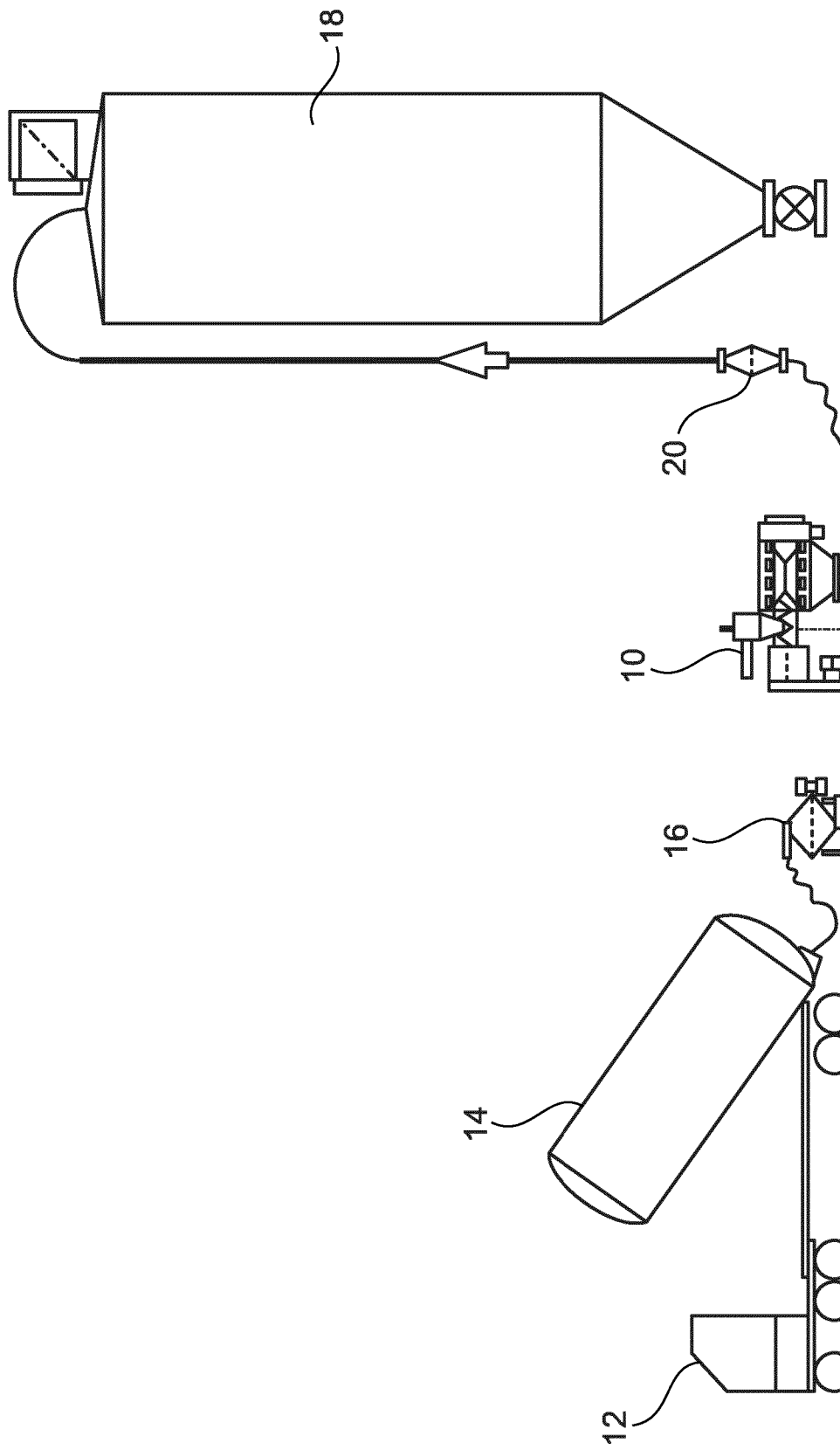
FIG. 1 is a representation of a cyclonic feed apparatus according to an embodiment of at least one aspect of the present invention wherein the cyclonic feed apparatus is receiving material from an unloading vehicle and feeding material to a storage silo.

FIG. 1 is a representation of a cyclonic feed apparatus 10 according to the present invention. As shown in FIG. 1, the cyclonic feed apparatus 10 is capable of receiving material from a vehicle 12. The vehicle 12 contains a transport silo 14 which feeds material to a vibration sifter 16. The vibration sifter 16, which is an optional feature, shakes the material to be conveyed and helps to prepare the material to be pneumatically conveyed by breaking down any large clumps of condensed material. This material is then fed to the cyclonic feed apparatus 10. Material then passes through the cyclonic feed apparatus 10 which is described in more detail below. The pneumatically conveyed material is then fed into a storage silo 18 via, for example, any suitable means such as a static sifter (e.g. a grid) 20.

Figure 2:
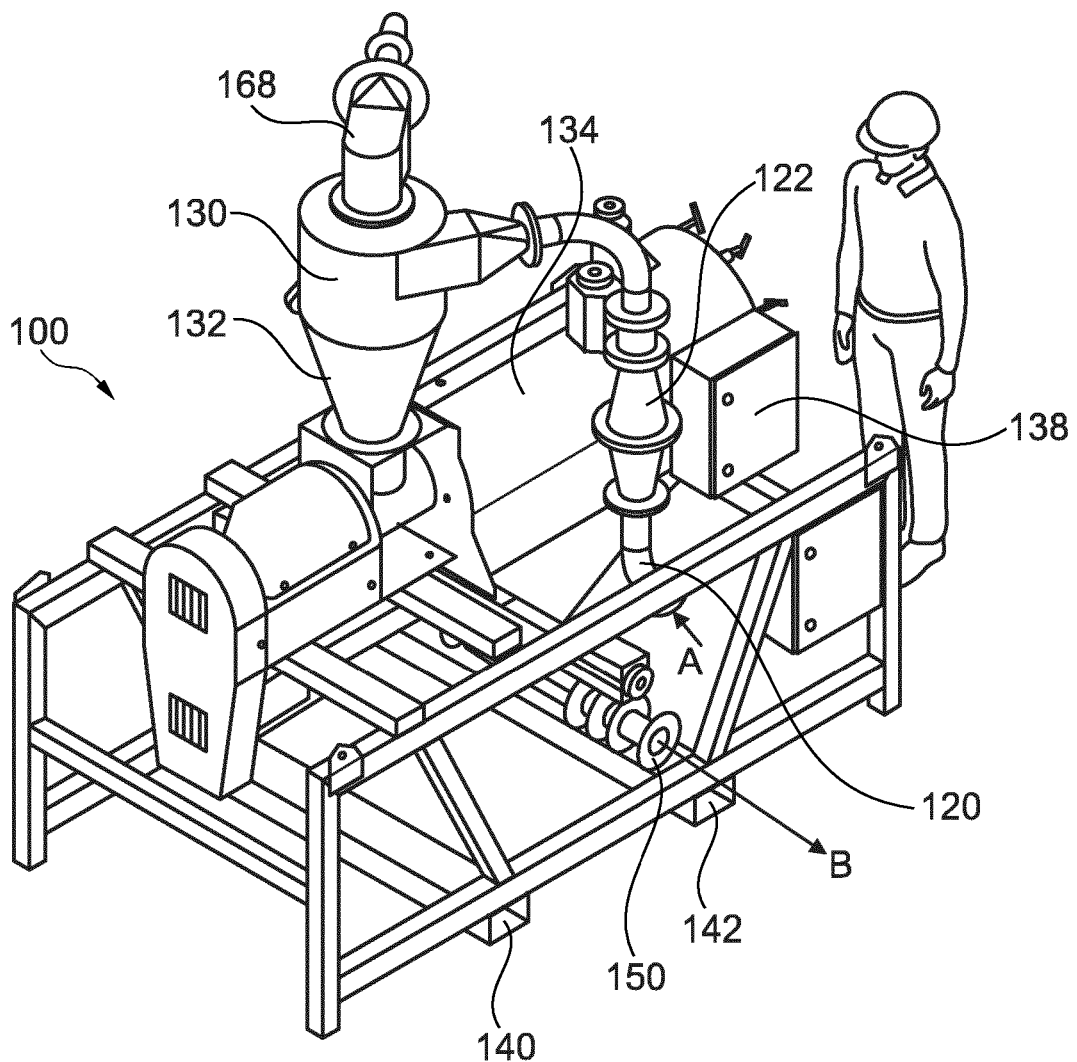
FIG. 2 is a representation of a cyclonic feed apparatus according to a further embodiment of at least one aspect of the present invention.
Figure 3:
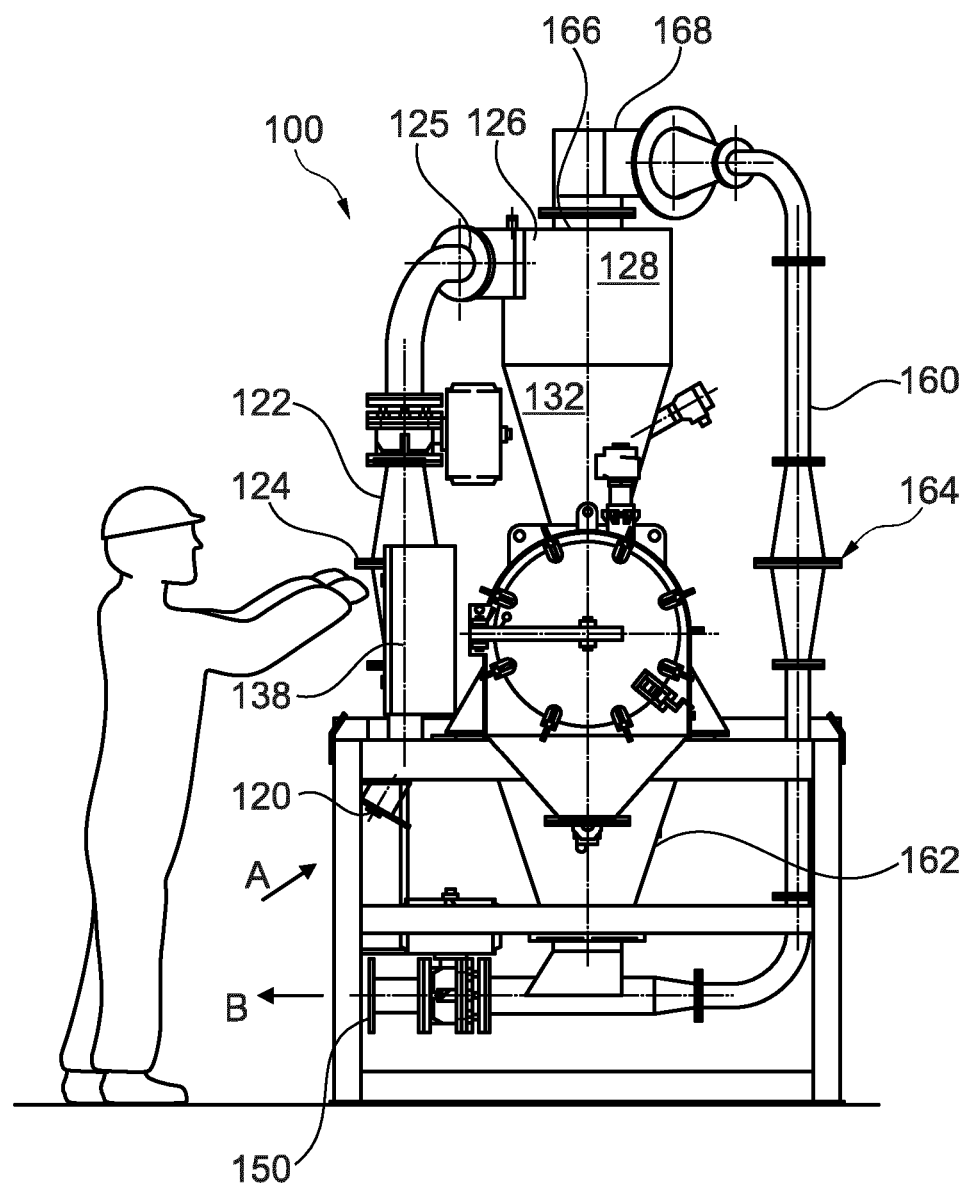
FIG. 3 is a side view of the cyclonic feed apparatus shown in FIG. 2.
Figure 4:
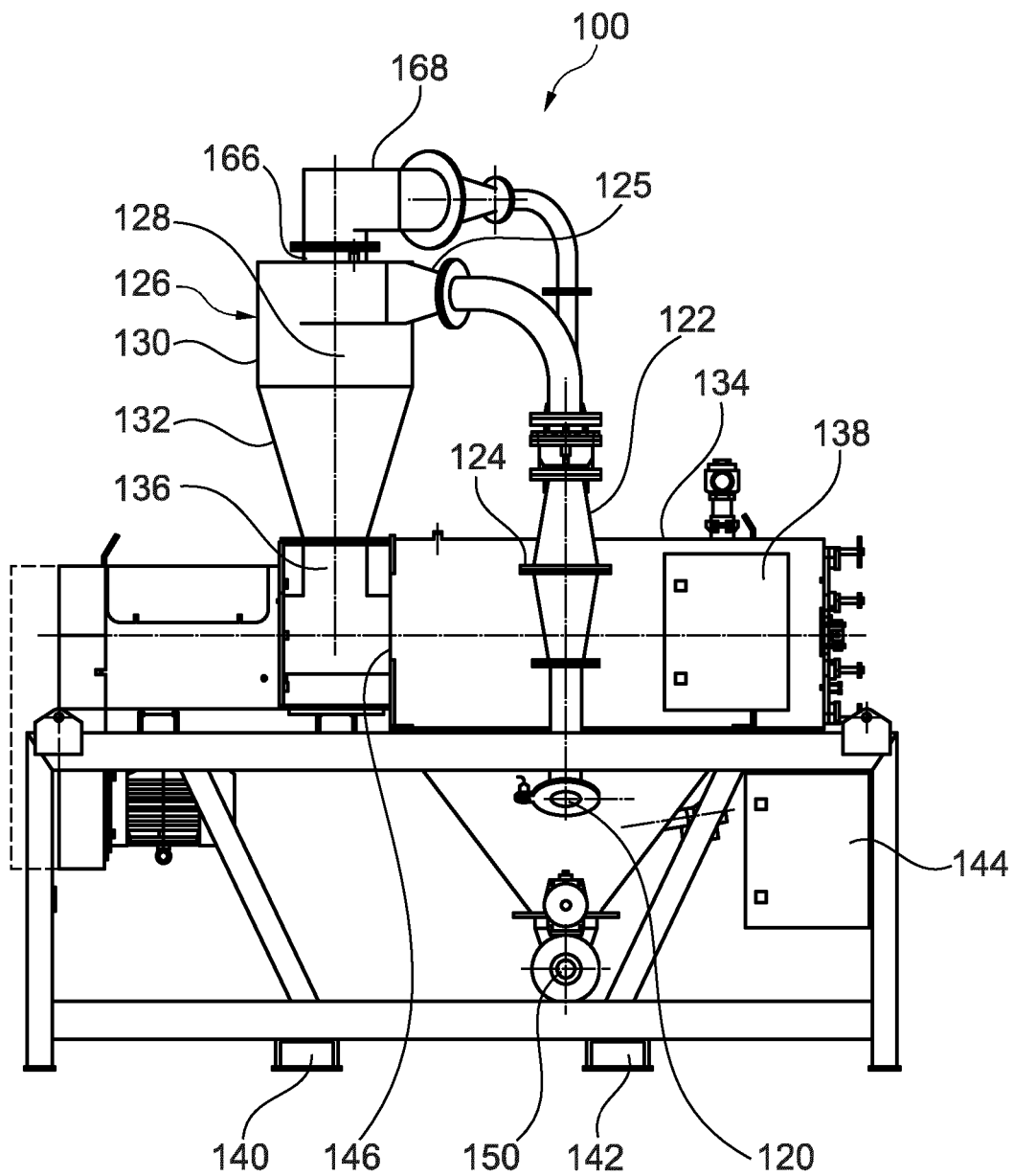
FIG. 4 is a front view of the cyclonic feed apparatus shown in FIGS. 2 and 3.

FIGS. 2 to 4 are representations of a further cyclonic feed apparatus 100 according to the present invention.

FIGS. 2 and 3 show material entering via the direction identified by arrow 'A' into the inlet feed 120. FIG. 3 also shows the material exiting the cyclonic feed apparatus 100 via outlet feed 150 along the direction identified by arrow 'B'.

FIGS. 2 to 4 show that the cyclonic feed apparatus 100 comprises an inlet feed 120. Through the inlet feed 120 material may be received from the transport silo and optionally the vibration sifter 16. Pneumatically conveyed material is then fed up through a substantially vertically located passageway 122, for example, in the form of a pipe. Located along the substantially vertical passageway 122 there is a coarse sieve 124.

The conveyed material is then passed through inlet 125 into an upper section of a cyclone separator 126. The cyclone separator 126 may have a large volume such as over 50, 100 or 200 litres. The cyclone separator 126 is located substantially vertically along a substantially vertical axis 128 of the cyclonic feed apparatus 100. The cyclone separator 126 comprises two main sections. The first upper section 130 is substantially cylindrical in shape. The lower main section 132 is in a funnel form to feed material into the sifting device 134. It should be noted that the size and proportions of the cylindrical and funnel shapes may vary significantly from what is shown in the figures.

Material is fed through the lower main section 132 of the cyclone separator 126 via an outlet 136 into the sifting device 134 through an opening 146. The sifting device 134 is a centrifugal sifting device. This is described in more detail below.

Material once passed through the cyclone separator 126 and the sifting device 134, then exits the cyclonic feed apparatus 100 via an outlet 150.

FIGS. 2 to 4 also show that the cyclonic feed apparatus 100 comprises a control panel 138 which is used to control the apparatus 100 and monitor the feed rate and operation of the apparatus 100.

The cyclonic feed apparatus 100 also comprises elongate sections 140, 142 in the form of skids which allows a fork lift truck to easily lift and manoeuvre the cyclonic feed apparatus 100.

There is also shown a pneumatic control device 144 which is used to control the pneumatic feed.

FIGS. 2 to 4 also show that there is a conduit generally designated 160 which extends from below the sifting device to above the cyclone separator 126. In particular, the conduit 160 is in the form of a pipe extending from below a chute 162 located below the device 134. The conduit 160 comprises a substantially vertical section which may comprise a sieve 164. The conduit 160 then extends to above the cyclone separator 126 and is then connected to an upper section of the cyclone separator 126 via a section of pipe 168 and an upper located inlet 166.

The function of the conduit 160 is to take the separated air from the cyclone separator 126 and reintroduce the air into the pneumatic conveying pipeline, via the outlet 150. This novel process of using the separated air to continue to convey the material after the sifting device 134 has many benefits. One such benefits is that there only needs to be one propulsive air source to convey material through the whole system. The air which is used to introduce the material into the cyclonic feed apparatus 100, is the same as the air used to convey the material out of the apparatus 100. This removes any need for additional energy sources within the apparatus to convey the air, thereby making the process more energy efficient.

Figure 5:
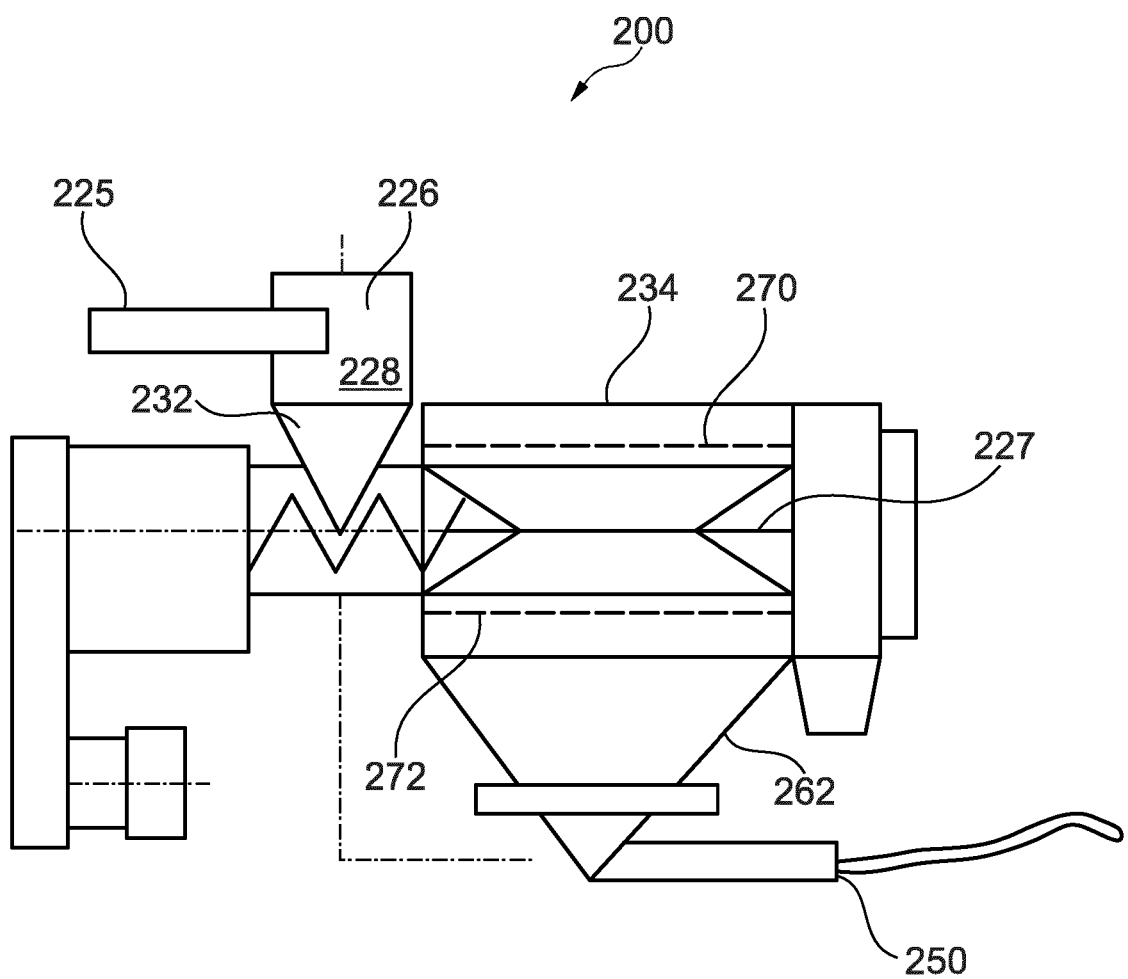
FIG. 5 is a representation of a sectional side view of a further cyclonic feed apparatus according to an embodiment of at least one aspect of the present invention wherein the cyclonic feed apparatus is attached to a centrifugal sifter.

FIG. 5 represents part of a further cyclonic feed apparatus 200 according to the present invention. The cyclonic feed apparatus 200 comprises a cyclone separator 226 which comprises an upper section 228 and a lower section 232. There is also shown an inlet 225 into an upper section of the cyclone separator 226.

Of particular relevance, FIG. 5 shows a sifting device 234. The sifting device 234 is generally a substantially hollow cylindrical member which is located substantially horizontally. The sifting device 234 comprises a centrally and substantially horizontally mounted shaft 227 which is rotated during use resulting in material being forced to the outside surfaces 270, 272 of the sifting device 234 via centrifugal forces. Although not shown, outlying and/or protruding members such as paddles maybe located on the shaft 227 which assist in the material being stirred and/or rotated. There is also shown a chute 262. Sifted material exits through outlet 250.

Figure 6:
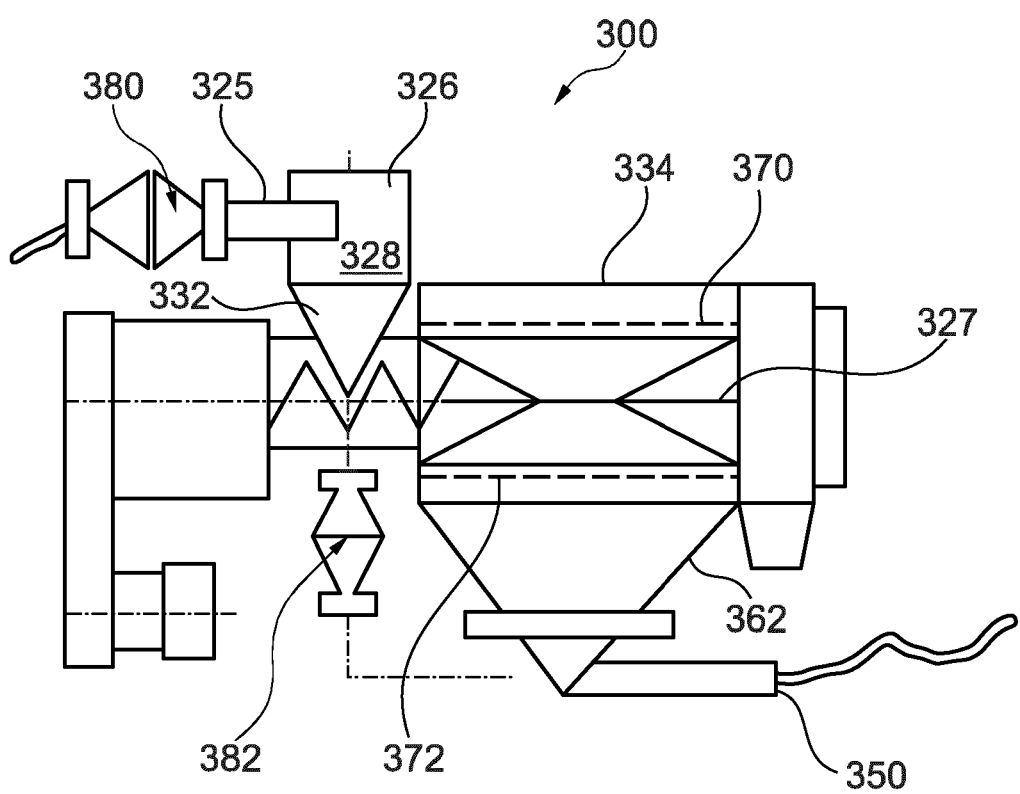
FIG. 6 is a representation of the cyclonic feed apparatus and centrifugal sifter shown in FIG. 5 with an additional filter and an additional bypass fitted.

FIG. 6 represents a further cyclonic feed apparatus 300 according to the present invention. The cyclonic apparatus 300 shown in FIG. 6 is very similar to the cyclonic apparatus 200 shown in FIG. 5.

The cyclonic apparatus 300 comprises a cyclone separator 326 which comprises an upper section 328 and a lower section 332. There is also shown an inlet 325 into the upper section 328 of the cyclone separator 326. Of particular relevance, FIG. 5 shows a sifting device 334.

The sifting device 334 is generally a substantially hollow cylindrical member which is located substantially horizontally. A shaft 327 optionally comprising outlying and/or protruding members such as paddles is rotated during use resulting in material being forced to the outside surfaces 370, 372 of the sifting device 334 via centrifugal forces. There is also shown a chute 362. Sifted material exits through outlet 350.

The cyclonic feed apparatus 300 also comprises a coarse screen 380 which is used to filter material prior to entering the cyclone separator 326. The coarse screen 380 may have a screen range size of about 10-30 mm or about 15 mm. There is also shown a fine screen 382 which secures an air bypass. The fine screen 382 may have a screen range size of about 0.5-5 mm or about 2 mm.

The air bypass with a cyclone provides that the pneumatically conveyed product has a possibility to be sieved because the airspeed and/or volume fluctuates due to a range of factors such as any one of or combination of the following: pneumatic conveying settings set by a truck driver; air supply; amount of product and a tanker silo on a vehicle; a variety of piping which may be used in different apparatus; and pressure drops anywhere in the systems.

The cyclonic apparatus 200, 300 shown in FIGS. 5 and 6 may be used in the embodiments shown in FIGS. 1 to 4.

Figure 7:
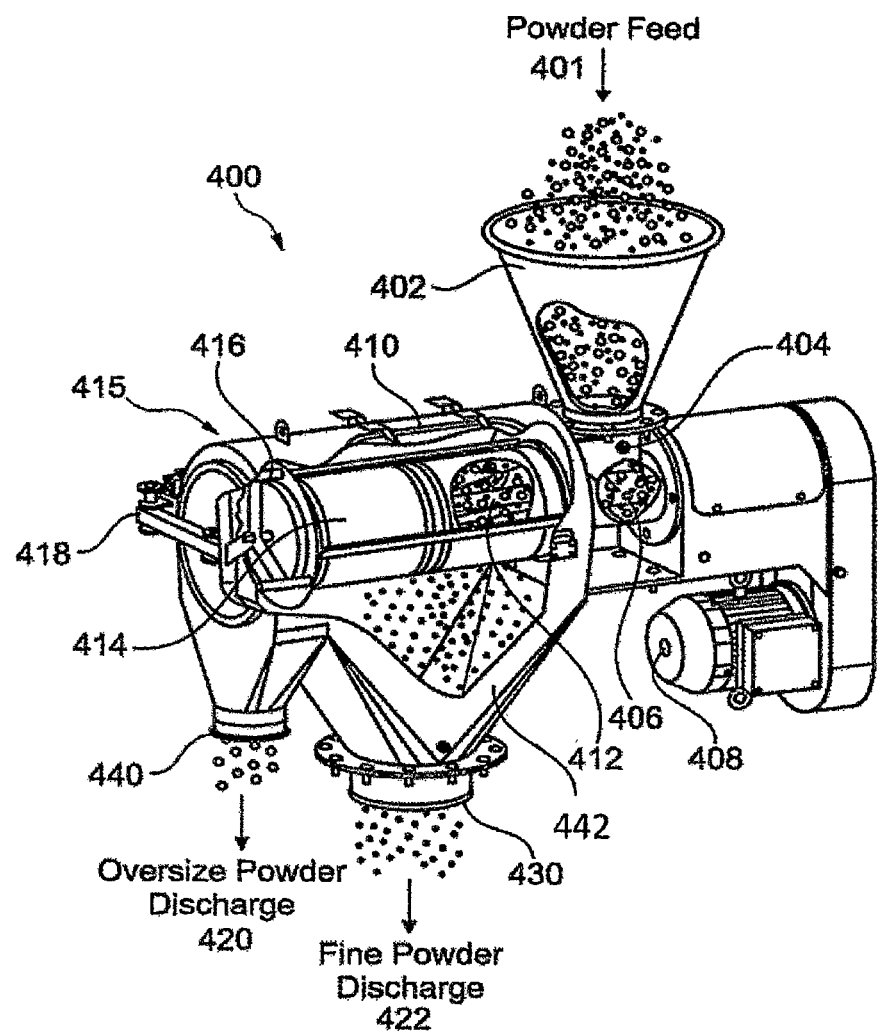
FIG. 7 is a representation of a partial sectional view of a further cyclonic feed apparatus according to an embodiment of at least one aspect of the present invention showing the separation of oversize powder discharge (e.g. waste material) and fine powder discharge (e.g. valuable product material)

FIG. 7 is a representation of a partial sectional view of a further cyclonic feed apparatus 400 according to the present invention. The cyclonic feed apparatus 400 is shown in a partial sectional view which illustrates the travel of pneumatically conveyed material through the apparatus 400. This will now be discussed.

As shown in FIG. 7, powder feed material 401 is fed into a hopper 402. The powder feed material 401 may be fed from a transport silo 14 as shown in FIG. 1. However, it should be noted that the powder feed material 401 may be fed from any location or storage system.

The powder feed material 401 is therefore gravity fed via the hopper 402 into a cyclone separator 404. The cyclone separator 404 will be similar to that shown in FIGS. 2 to 5. As shown in FIG. 7, the cyclone separator 404 is located substantially vertically. The cyclone separator 404 comprises an upper section through which material 401 is fed into from the hopper 402 and a lower section 406. Inside the cyclone separator 404 a vortex of air and particulate material is formed where separation of the material 401 may occur. This is discussed in more detail below.

As shown in FIG. 7, the material exits the cyclone separator 404 along a substantially horizontal path into the sifting device generally designated 415. The material may be fed into the sifting device 415 via any suitable means such as a screw shaft.

The sifting device 415 has an outer casing 410 which may contain an opening in the form of a door which may allow inspection and maintenance of the sifting device 415.

FIG. 7 also shows that there is a substantially centrally mounted shaft 412 which extends substantially horizontally through the sifting device 415. Although not shown, the substantially centrally mounted shaft 412 may comprise outlying and/or protruding members such as paddles which may assist in the stirring and/or rotation of the material within the sifting device.

FIG. 7 also shows that the sifting device 415 comprises a substantially horizontally mounted substantially cylindrical sieve 414 within which the powder feed material 401 is rotated and circulated at a speed of: about 100-1,000 rpm; about 200-750 rpm or about 500 rpm. The speed varies for different sizes of machines and the diameters of rotation involved.

The cylindrical sieve 414 comprises a mesh-like structure with a series of small apertures. The apertures in the mesh-like structure may have a cross-sectional diameter of any of the following: about 50 mm; about 100 mm; about 200 mm; about 300 mm; about 380 mm; about 400 mm; about 500 mm; about 600 mm; about 700 mm; about 800 mm; about 900 mm; about 1,000 mm; or about 2,000 mm. Alternatively, the apertures may have a cross-sectional diameter of any of the following: about 100-1,000 mm; about 200-750 mm; about 300-500 mm; or about 300-400 mm.

The mesh-like structure allows fine particulate material 422 to pass through the cylindrical sieve 414 and exit as shown as a fine powder discharge 422 through an outlet 430 located below the sifting device 415.

The cross-sectional size of the fine powder discharge 422 particles is selected from any of the following: about 50 microns to about 50 mm; about 100 microns to 10 mm; or about 200 microns to 10 mm.

The fine powder discharge 422 is valuable product material. It has been found that the present invention allows the capture of a much greater percentage of fine powder discharge material 422 in comparison to prior art systems. This is because fewer 'clumps' of material enter into the sifting device 415, due to the presence of the cyclone separator 404. The cyclone separator 404 maintains an almost constant material mass flow rate at its outlet, before being fed into the sifting device 415. The constant mass flow rate received by the sifting device 415 prevents the sifting device 415 becoming clogged up, and becoming less efficient.

Larger particulate material (e.g. waste material) is retained within the cylindrical sieve 414 and exits through an outlet 440 as an oversize powder discharge 420. The size of the oversize powder discharge 420 particles is larger than the apertures or holes in the cylindrical sieve 414.

FIG. 7 also shows that the cyclonic feed apparatus 400 comprises a release assembly 416 which may in some embodiments be a quick release basket assembly. There is also a motor 408 which is used to provide rotation to the shaft 412 located in the sifting device 415.

Furthermore, there is shown an inspection door 418 which may be hinged and quick release to allow easy and quick access. There is also a chute 442 which collects the fine powder material which exits as a fine powder discharge 422.

Figure 8:
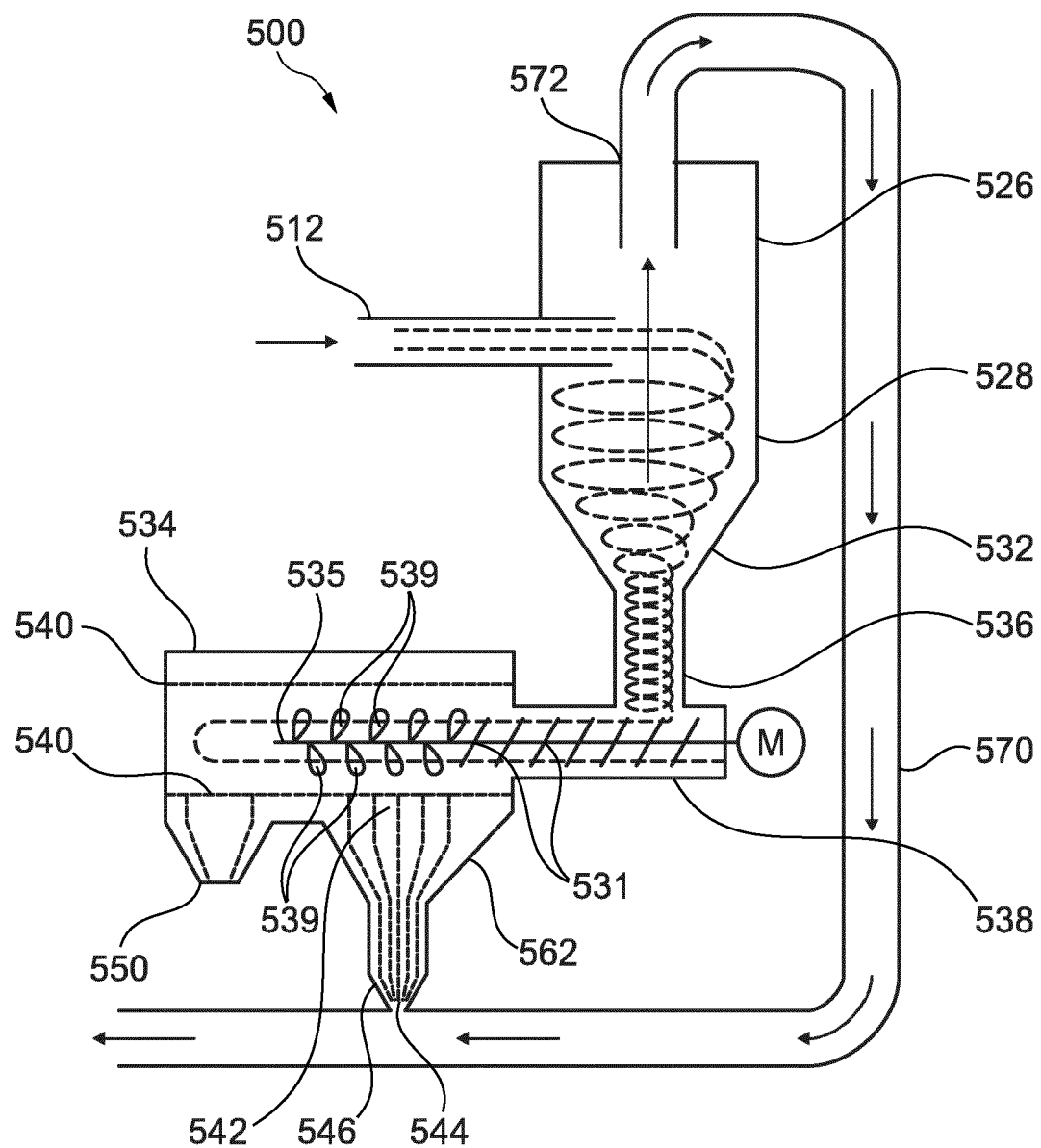
FIG. 8 is a representation of a further cyclonic feed apparatus according to an embodiment of at least one aspect of the present invention illustrating the flow of material and air through a cyclone separator and a centrifugal sifter during use.

FIG. 8 is a further cyclonic feed apparatus according to the present invention generally designated 500. The cyclonic feed apparatus 500 is similar to the apparatus previously described in FIGS. 1 to 7.

The cyclonic feed apparatus 500 comprises a cyclone separator 526 which is located substantially vertically. The cyclone separator 526 comprises an upper section 528 which is substantially cylindrical and a lower section 532 which funnels material down into a sifting device 534.

As shown in FIG. 8, particulate material enters via an inlet 512 into the upper section 528 of the cyclone separator 526. Although not shown there may be more than one, two, three or a plurality of inlets feeding particulate material into the cyclone separator 526.

A preferred embodiment is shown in FIG. 8 where the inlet 512 passes the particulate material in a substantially tangential direction into the cyclone separator 526 which is substantially cylindrical in shape. The tangential direction is tangential to a central axis extending through the centre of the cyclone separator 526. The tangential direction of the particulate material has been found to be preferred but other directions of input for the material may be used.

The material may be fed at a velocity 'V' into the cyclone separator 526 at a range of: about 5 m/s to 100 m/s; about 20 m/s to about 60 m/s or about 8 m/s to 50 m/s. Alternatively, the material may be fed at a velocity 'V' into the cyclone separator 526 at a range of: about 5 m/s; about 10 m/s; about 20 m/s; about 30 m/s; about 40 m/s; about 50 m/s; about 60 m/s; about 60 m/s; about 70 m/s; about 80 m/s; about 90 m/s or about 100 m/s.

As shown in FIG. 8, the particulate material is then caused to rotate in a cyclonic vortex due to the rotation of air within the cyclonic separator 526. They pneumatically conveyed air and particulate material fed into the inlet 512 causes the cyclonic vortex rotation of the air and particulate material within the cyclone separator 526. During the cyclonic motion of the particulate material the particulate material is forced to the outer surfaces of the cyclone separator 526 in a vortex-like manner.

The particulate material then passes through an outlet 536 of the cyclone separator 526 and into a substantially horizontally located channel 538. Via the channel 538 material is then fed via, for example, a screw shaft, and pneumatically conveyed into the sifter device 534. The screw shaft may be driven by a motor.

As shown in the cross-sectional view in FIG. 8, the sifter device 534 comprises a substantially longitudinally oriented cylindrical hollow sieve 540. For example, the cylindrical sieve 540 may be in the form of a drum. The cylindrical sieve 540 comprises a mesh-like structure with a series of small apertures with the cross-sectional diameter. Alternatively, the cylindrical sieve 540 may comprise and be lined with a series of screens which are perforated with holes.

The apertures in the mesh-like structure have a cross-sectional diameter of any of the following: about 50 mm; about 100 mm; about 200 mm; about 300 mm; about 380 mm; about 400 mm; about 500 mm; about 600 mm; about 700 mm; about 800 mm; about 900 mm; about 1,000 mm; or about 2,000 mm. Alternatively, the apertures have a cross-sectional diameter of any of the following: about 100-1,000 mm; about 200-750 mm; about 300-500 mm; or about 300-400 mm.

A screw conveyor 531 is shown transferring the material from the outlet 536 of the cyclone separator 526 along and into the sifter device 534. However, any suitable type of device may be used to assist the transfer of the material into the sifter device 534.

There is also shown a shaft 535 which contains a series of outlying and/or protruding members (e.g. paddles) 539 which are used to assist in the stirring and/or rotation of the material. The shaft 535 is therefore rotated and driven by the motor M whereupon the outlying and/or protruding members (e.g. paddles) 539 force the material outwards to the cylindrical sieve 540. This allows the separation of the material to occur under centrifugal forces into smaller and larger particulate material.

There is also shown a chute 562. Sifted material exits through outlet 546.

The mesh-like structure allows fine particulate material 542 to pass through the cylindrical sieve 534 and exit as shown as a fine powder discharge 544 out through an outlet 546 from the bottom of the cyclonic feed apparatus 500. The size of the fine powder discharge 544 particles is smaller than the size of the apertures in the mesh-like structure.

Larger sized particulate material is retained within the cylindrical sieve 540 and exits through an outlet 550 as an oversize powder discharge. The size of the oversize powder discharge particles is larger than the size of the apertures in the mesh-like structure in the cylindrical sieve 540. The flowrate of the oversized power discharge particles may depend upon the efficiency of the sieving process, i.e. a higher rate of sieving efficiency=a lower flow rate of oversized particles.

FIG. 8 also shows that there is a conduit (or passageway) 570 connecting the upper section 528 of the cyclonic separator 526 and the outlet 546 from the bottom of the cyclonic feed apparatus 500. There is therefore a flow of air from an opening 572 located on an upper surface of the cyclone separator 526 along the conduit (or passageway) 570 to the outlet 546 located below the sifting device 534. This has been found to be pneumatically efficient in conveying the material and air. The additionally conveyed pneumatic air along the conduit (or passageway) 570 may therefore collect and assist in transfer of the fine powder discharge 544. This is a specific advantage of the present invention in that there is a highly efficient use of the pneumatically conveyed air in the whole system.

Material exiting from the outlet 546 at the bottom of the cyclonic feed apparatus 500 may then be collected and continued to be conveyed.

Figure 9:
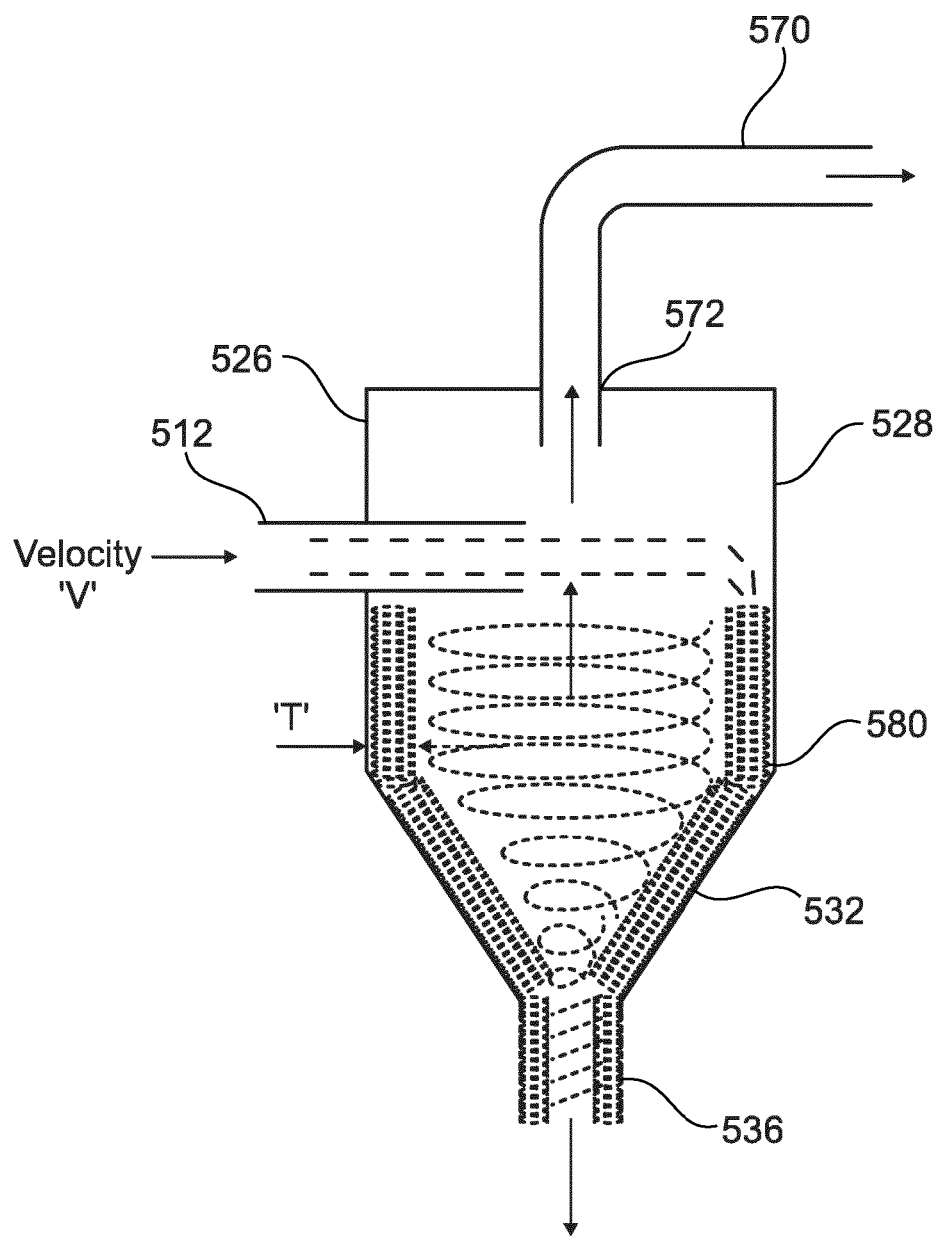
FIG. 9 is an expanded cross-sectional view of the cyclone separator shown in FIG. 8 illustrating the flow of material and air through the apparatus during use.

FIG. 9 is an expanded cross-sectional view of the cyclone separator 526 shown in FIG. 8. The particulate material 580 is shown to be thrown against the sidewalls of the upper section 528 of the cyclone separator 526 and then funneled down along into the lower section 532 of the cyclone separator 526. Pneumatically fed air and material is tangentially fed via inlet 512 into the cyclone separator 526 at a sufficient rate to cause a vortex within the cyclone separator 526 to allow separation of material to start to occur.

FIG. 9 clearly shows that the cyclone (i.e. vortex) of air builds a rotating mass of material 580 against the sidewalls of the cyclonic separator 526. The material being formed against the sidewalls of the cyclonic separator 526 therefore forms, for example, a tubular shape.

A specific advantage of the rotating mass of material 580 in the cyclone separator 526 is that the rotating mass of particulate material 580 has the ability to absorb sudden increases in material feed by adjusting the thickness dimension 'T' and density of the particulate material 580 being forced against the inner surfaces of the cyclone separator 526. The dimension 'T' showing the thickness of the tubular shape of particulate material circulating in a cyclone form is shown in FIG. 9.

The velocity 'V' of the air and particulate material being fed into the cyclone separator 526 has to be sufficiently high to cause the particulate material to spin and form, for example, a substantially tubular shape. The required velocity 'V' of the air and particulate material being fed into the cyclone separator 526 changes with different materials but is typically in the range of: 5 m/s to 100 m/s; or 8 m/s to 50 m/s. As described in reference to FIG. 8, after the air has created a cyclone, it exits up through the centre of the cyclone separator 526 via the outlet 572.

The apparatus described in the present invention have a number of technical advantages and benefits. The centrifugal sifters described in the present invention use a fine aperture screen to separate material into oversize powder discharge (e.g. waste product) and fine powder discharge (e.g. desired product). A "large" aperture screen can tolerate variations in instantaneous mass flow rate and airflow which occurs inherently in pneumatic conveying systems. The market trend is to use "finer" apertures two separate waste and product. The finer the aperture the less tolerant the screen is of the air and variations of air entering the feeding by pneumatic conveying. The present inventors have found that it is highly advantageous in such situations to use a cyclonic separator (i.e. a cyclonic centrifuge) to smooth out the mass flow by damping the fluctuations in the cyclone body and also by separating the air from the material using the cyclone. It has been found that the combination of these two aspects (i.e. the cyclonic separator and the centrifugal sifter) provides a more stable system with reduced mass flow fluctuations. The flow of separated material and air is then presented to the fine aperture screen of the cyclonic sifter. This allows the centrifugal sifter to pass a larger amount of material than would otherwise be the case in the short residence time the material has in the centrifugal sifter. This results in less waste material (i.e. oversize powder discharge) and more product (i.e. fine powder discharge) being separated even if a finer aperture screen is used in the centrifugal sifter. This is a significant advantage over prior art systems.

The present inventors have therefore found it to be technically advantageous to take a cyclone which is usually used to separate air and material at atmospheric pressure and use it at positive pressure (i.e. above atmospheric pressure) in order to store material in order to dampen the constant variation in mass flow inherent to pneumatic conveying. It has also been found that by using the cyclone at positive pressure provides the further advantage in that positively pressurised air can be reused to pneumatically convey the "product" from the centrifugal sifter to the downstream process. This is shown in FIG. 8 using the conduit 570. This provides the additional benefit of avoiding the need for a second pneumatic conveying power source that would otherwise be required. There are clear environmental and commercial benefits in only having the requirement for one pneumatic conveying power source.

Example

As a specific example we now compare using a prior art vibration sifter to separate material such as wheat flour in comparison to the apparatus according to the present invention using the combination of a cyclonic separator and centrifugal sifter as shown in FIGS. 8 and 9.

It has been found that using the combination of cyclonic separator and centrifugal sifter allows smaller mesh widths to be used in the centrifugal sifter, greater throughput is achieved, there is significantly reduced de-agglomeration of the particulate material being conveyed, and a much finer sieving is achievable.

Using a prior art vibration sifter with a mesh size of 50/70 μm it was compared with the apparatus 500 according to the present invention of using a combination of a cyclonic separator 526 and cyclonic sifter device 534 with a mesh size of 50/70 μm.

Using the prior art system with a vibration sifter the following was achievable.
Capacity Wheat Flour:
    D50=50/70 micron
    MW 2 mm≈30-35 T/hr.
    MW 5 mm≈40-45 T/hr.

In comparison, using the present invention combination of the cyclonic separator and a cyclonic sifter the following was achievable:
Capacity Wheat Flour:
    D50=50/70 micron
    MW 2 mm≈5-6 T/hr.
    MW 5 mm≈15-20 T/hr.

Using the present invention it was therefore possible to achieve a much higher tonnage rate per hour (i.e. T/hr.) for the pneumatically conveyed particulate material.

Whilst specific embodiments of the present invention have been described above, it will be appreciated that departures from the described embodiments may still fall within the scope of the present invention. For example, any suitable type of cyclonic separator and cyclonic sifter may be used. Moreover, any suitable type of pipework may be used to connect the different parts of the apparatus. The apparatus of the present invention may also be used to convey any suitable type of particulate, granular and/or powder bulk material.

The invention claimed is:

1. An apparatus (500) for pneumatically conveying and separating bulk material comprising:
    a vessel (526) for receiving and separating gas and bulk material, wherein the vessel (526) comprises a gas outlet (572);
    at least one material inlet (512) located on the vessel (526) configured to input gas and bulk material into the vessel (526) at a rate of 5 m/s to 100 m/s and thereby form a cyclone which separates the gas and bulk material within the vessel (526);
    a sifting device (534) for receiving the bulk material from the vessel (526), wherein the sifting device (534) comprises a first sifter outlet (546), wherein bulk material is separated via centrifugal forces into at least two or more different powder discharges; and
    a pneumatic air conduit (570) directly connected with the gas outlet (572) and the first sifter outlet (546), wherein the pneumatic air conduit (570) is configured to provide uninterrupted gas flow to the first sifter outlet (546).

2. An apparatus (500) for pneumatically conveying and separating bulk material according to claim 1, wherein the vessel (526) is a cyclonic separator and the sifting device (534) is a centrifugal sifting device, wherein the sifting device (534) further comprises a second sifter outlet (550), wherein the sifting device (534) is configured to separate pneumatically conveyed material into oversize powder discharge via the second sifter outlet (550) and fine powder discharge (544) from the first sifter outlet (546).

3. An apparatus (500) for pneumatically conveying and separating bulk material according to claim 2, wherein the sifting device (534) is in the form of a cylindrical sieve comprising a mesh-like structure with a series of small apertures, the small apertures having a cross-section diameter of 100-1,000 mm, and
    wherein larger particulate material is retained within the cylindrical sieve and exits through the second sifter outlet (550) as an oversize powder discharge and fine particulate material passes through the cylindrical sieve as a fine powder discharge and exits through the first sifter outlet (546) as a fine powder discharge.

4. An apparatus (500) for pneumatically conveying and separating bulk material according to claim 2, wherein by rotating the material in the sifting device (534) causes at least part of the bulk material to pass through perforations and/or apertures in the sifting device (534), and wherein material which passes through perforations of the sifting device (534) exits the sifting device (534) via the first sifter outlet (546) as fine powder discharge and is valuable product material and larger sized particulate material which is unable to pass through the perforations in the sifting device (534) exits the sifting device (534) via the second sifter outlet (550) as oversize powder discharge and is waste material.

5. An apparatus (500) for pneumatically conveying and separating bulk material according to claim 1, wherein the vessel (526) is substantially cylindrical in shape with a conically shaped bottom section (532) which is used to funnel material to the sifting device (534).

6. An apparatus (500) for pneumatically conveying and separating bulk material according to claim 1, wherein the vessel (526) is located substantially vertically during use and has a substantially longitudinal axis extending vertically through the vessel (526) thereby allowing the separated bulk material to be gravity fed to the sifting device (534).

7. An apparatus (500) for pneumatically conveying and separating bulk material according to claim 1, wherein the vessel (526) comprises two or more material inlets for the inputting of air and bulk material into the vessel (526).

8. An apparatus (500) for pneumatically conveying and separating bulk material according to claim 1, wherein the at least one material inlet (512) is located on the vessel (526) substantially tangential to a longitudinal axis of the vessel (526) thereby facilitating the formation of a cyclone of air and bulk material within the vessel (526).

9. An apparatus (500) for pneumatically conveying and separating bulk material according to claim 1, wherein the vessel (526) comprises at least one or more air and/or material outlets which feed separated air and material to the sifting device (534).

10. An apparatus (500) for pneumatically conveying and separating bulk material according to claim 1, wherein in use a positive pressure gradient is maintained from the at least one material inlet (512) to the first sifter outlet (546).

11. An apparatus (500) for pneumatically conveying and separating bulk material according to claim 1, wherein the sifting device (534) comprises a material inlet for receiving air, material, or a combination thereof from the vessel (526).

12. An apparatus (500) for pneumatically conveying and separating bulk material according to claim 1, wherein the sifting device (534) is in the form of a cylindrical chamber which is positioned substantially horizontally.

13. An apparatus (500) for pneumatically conveying and separating bulk material according to claim 1, wherein the sifting device (534) is lined with a series of perforations in the form of a perforated sheet, and
    wherein the sifting device (534) comprises a shaft with outlying and/or protruding members located on the shaft which on rotation are used to stir and/or rotate the material within the sifting device whereupon under centrifugal forces, the stirred and/or rotated material is forced against the perforated sheet or a substantially cylindrical sieve in the form of a perforated drum or mesh-like structure which allows separation of the bulk material to occur into larger and smaller particulate material.

14. An apparatus (500) for pneumatically conveying and separating bulk material according to claim 1, wherein the apparatus also comprises a hopper (402) to feed bulk material from a transport silo or any other storage system into the apparatus, and
    wherein the sifting device (534) comprises a drive to rotate a cylindrical sieve located in the sifting device (534).

15. An apparatus (500) for pneumatically conveying and separating bulk material according to claim 1, wherein in use a positive pressure gradient is maintained in the vessel (526).

16. An apparatus (500) for pneumatically conveying and separating bulk material according to claim 1, wherein the at least one material inlet (512) contains a screen with a screen size of 10 to 30 mm.

17. A method of conveying and separating bulk material comprising:
    providing a vessel (526) for receiving and separating gas and bulk material, wherein the vessel (526) comprises a gas outlet (572);
    providing at least one material inlet (512) located on the vessel (526) configured to input air and bulk material into the vessel (526) at a rate of 5 m/s to 100 m/s and thereby forming a cyclone which separates the gas and bulk material within the vessel (526);
    providing a sifting device (534) for receiving bulk material from the vessel (524), wherein the sifting device (534) comprises a first sifter outlet (546), wherein the sifting device (534) separates the bulk material via centrifugal forces into at least two or more different powder discharges; and
    providing a pneumatic air conduit (570) directly connected with the gas outlet (572) and the first sifter outlet (546), wherein the pneumatic air conduit (570) is configured to provide uninterrupted gas flow to the first sifter outlet (546).

18. A method of conveying and separating bulk material according to claim 17, wherein in use a positive pressure gradient is maintained from the at least one material inlet (512) to the first sifter outlet (546).

19. A method of conveying and separating bulk material according to claim 17, wherein bulk material is caused to rotate in a cyclonic vortex due to the rotation of air within the vessel (526) and during the cyclonic motion of the bulk material, the bulk material is forced to inner surfaces of sidewalls of the vessel (526) in a vortex-like manner; and
    wherein during use, the bulk material is thrown against the sidewalls of an upper section of the vessel (526) and then funneled down along into a lower section (532) of the vessel (526) wherein the cyclone of air therefore builds a rotating mass of bulk material against the sidewalls of the vessel (526) which has the ability to absorb sudden increases and/or decreases in bulk material feed by adjusting a thickness dimension 'T' and density of the bulk material being forced against the inner surfaces of the sidewalls of the vessel (526).

20. A method of conveying and separating bulk material according to claim 17, wherein the at least one material inlet (512) contains a screen with a screen size of 10 to 30 mm.

21. A method of conveying and separating bulk material according to claim 17, wherein in use a positive pressure gradient is maintained in the vessel (526).

* * * * *